United States Patent

Magarian et al.

[11] 3,948,294
[45] Apr. 6, 1976

[54] IMPACT-PROTECTIVE COATING FOR PLASTIC PIPE

[75] Inventors: Gerald M. Magarian, Long Beach; Robert A. Thompson, Cerritos, both of Calif.

[73] Assignee: Ameron, Inc., Monterey Park, Calif.

[22] Filed: Sept. 16, 1974

[21] Appl. No.: 506,609

Related U.S. Application Data

[63] Continuation-in-part of Ser. No. 230,795, March 1, 1972, abandoned.

[52] U.S. Cl. ............... 138/141; 138/110; 427/204; 428/36
[51] Int. Cl.² ................................ F16L 9/14
[58] Field of Search .......... 138/110, 141, 177, 178, 138/174, DIG. 9; 117/33; 427/204; 428/36

[56] References Cited
UNITED STATES PATENTS

| 2,787,557 | 4/1957 | Christensen et al. | 427/204 |
| 2,925,831 | 2/1960 | Welty et al. | 138/141 |
| 3,304,219 | 2/1967 | Nickerson | 117/33 |
| 3,396,641 | 8/1968 | Welty et al. | 138/141 X |
| 3,483,896 | 12/1969 | Grosh | 138/141 |
| 3,607,511 | 9/1971 | Grosh | 138/174 X |
| 3,619,230 | 11/1971 | Matthews | 427/204 |

Primary Examiner—Richard C. Queisser
Assistant Examiner—Charles Gorenstein
Attorney, Agent, or Firm—Christie, Parker & Hale

[57] ABSTRACT

An energy-absorbing protective coating is bonded to the exterior of a plastic pipe. Preferably, the coating is a layer of low-cost, crushable, multicellular, inorganic particles, such as natural volcanic lightweight aggregate, expanded shale, expanded clay, pumice, slag, or furnace cinder, embedded in a thin film of plastic resin. The particles crush by breaking upon impact, which absorbs the energy of the impact and protects the pipe from damage.

10 Claims, 4 Drawing Figures

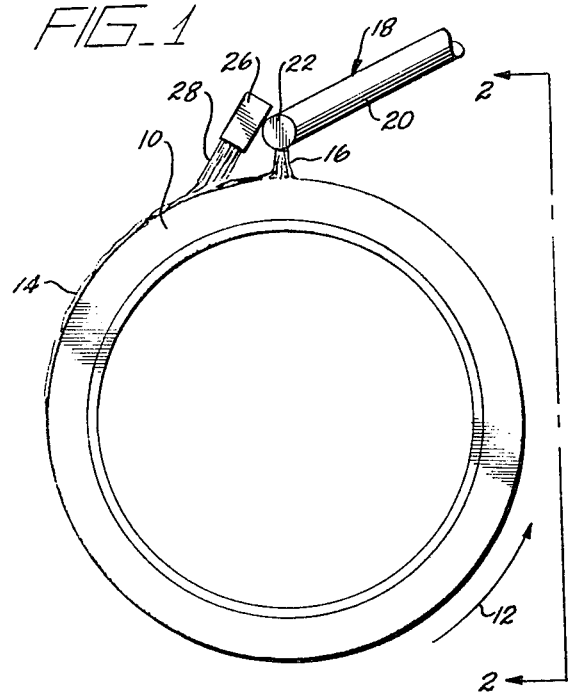
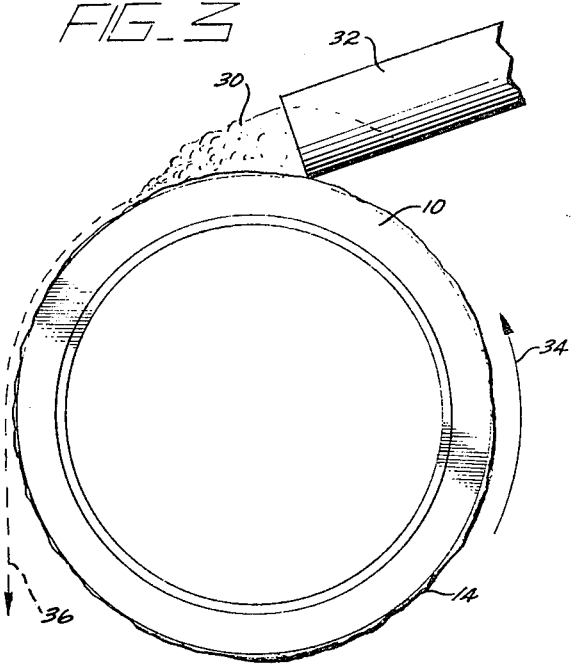
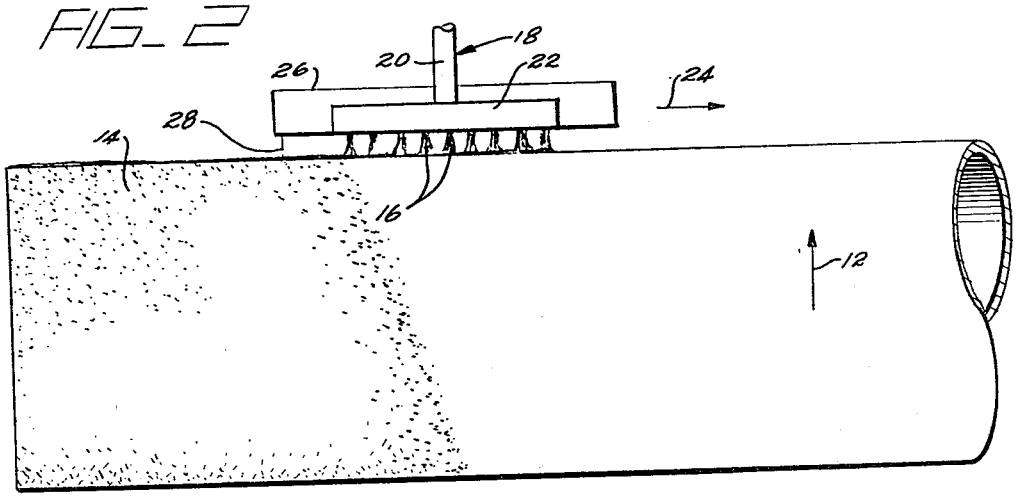
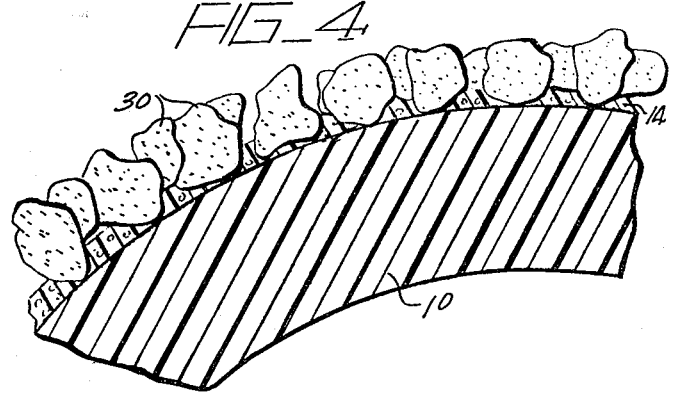

IMPACT-PROTECTIVE COATING FOR PLASTIC PIPE

CROSS-REFERENCE TO RELATED APPLICATION

This is a continuation-in-part of our application Ser. No. 230,795, filed Mar. 1, 1972, now abandoned.

BACKGROUND OF THE INVENTION

This invention relates to protecting plastic pipe from impact damage, and more particularly to a crushable, impact-protective coating applied to the exterior of plastic pipe.

Fiber-reinforced plastic pipe, particularly that made from thermosetting resin reinforced with glass fibers, is widely used because of its resistance to corrosive liquids and its high strength. It is extensively used, for example, in the chemical, petroleum, and paper-making industries. In these industries, the pipe is frequently installed above ground. In underground applications it is most commonly used to convey either water or sewage.

One of the disadvantages of plastic pipes made from thermosetting resins is that such pipes are brittle and therefore crack easily even when subjected to a relatively moderate blow. In many of the above applications, such plastic pipes are subjected to the risk of receiving impact damage during shipping or installation. For example, impact damage often occurs when the pipe is loaded or unloaded from trucks. In above-ground installations, the pipe is commonly hoisted by cables, and can receive impact damage when striking a stationary object, such as a post. In underground installations, impact damage usually comes from rocks which fall onto the pipe in a trench before the trench is back-filled.

SUMMARY OF THE INVENTION

Briefly, this invention provides an energy-absorbing coating for plastic pipe. The coating preferably includes a crushable, energy-absorbing, layer of multicellular inorganic particles bonded to the exterior of the pipe. The compressive characteristics of the multicellular particles are such that they tend to crush progressively upon impact rather than shattering. Such a protective pipe coating absorbs impact energy, and spreads the impact over a broader area by crushing to fit the shape of the impacting object. Multicellular inorganic particles, such as natural volcanic lightweight aggregate, expanded shale, expanded clay, pumice, slag, or furnace cinder, are especially suitable coating materials because they have the desired energy-absorbing characteristics and they are very low in cost. Best protection is provided if the compressive strength of the particles is such that they do not crush substantially unless an impact approaches the level that would damage an unprotected pipe.

BRIEF DESCRIPTION OF THE DRAWINGS

These and other aspects of the invention will be more fully understood by referring to the following detailed description and the accompanying drawings in which:

FIG. 1 is a schematic elevation showing a preferred method of applying a layer of bonding material to the exterior of a section of plastic pipe.

FIG. 2 is a schematic elevation view taken on line 2—2 of FIG. 1;

FIG. 3 is a schematic elevation view showing a preferred method of applying a layer of impact-protective particles to the bonding material layer shown in FIG. 1; and FIG. 4 is an enlarged fragmentary sectional elevation view of an impact-protective coating applied to a plastic pipe.

DETAILED DESCRIPTION OF THE PREFERRED EMBODIMENT

FIGS. 1 through 3 show a preferred method of coating a section of plastic pipe 10. The coating to be described below is particularly useful for protecting relatively thin-walled plastic pipes made from fiber-reinforced thermosetting resins. Such pipes are usually brittle and therefore crack relatively easily when receiving a blow from an impacting object.

During coating, pipe section 10 is rotated in the direction indicated by the arrow 12 shown in FIG. 1. As the pipe section is rotated, a thin film 14 of fluid bonding material 16 is spread onto the outer surface of the pipe. The bonding material, preferably a thixotropic plastic resin, is applied to the pipe exterior in the thinnest practical layer to minimize material costs. A typical thickness for the film layer is about 0.015 inch for a 6-inch diameter pipe, and about 0.025 inch for 24-inch diameter pipe.

FIGS. 1 and 2 show the preferred method of accurately controlling the thickness of the resin layer. A movable, T-shaped distribution head 18 located above pipe 10 spreads the resin onto the pipe. The distribution head comprises a substantially upright, elongated tubular feed conduit 20 through which the resin passes, and an elongated perforated distribution tube 22 at the lower end of the feed conduit for receiving the supply of resin and distributing it across the rotating pipe. The distribution head moves slowly in the direction of the arrow 24 in FIG. 2 as it distributes the resin.

A brush 26 adjacent the distribution head has soft bristles 28 held in contact with the resin film to spread it substantially uniformly across the outer surface of the pipe.

If the resin does not contain excessively abrasive fillers or pigments, it can be applied in the desired thickness by airless spray. If severe abrasives are present, or if the resin pot life is short, the preferred method of applying the resin is by the method shown in FIGS. 1 and 2.

Upon completion of the winding process during the manufacture of filament-wound pipe, the pipe typically has an excess of liquid resin on its surface. Thus, a suitably constructed wiper (not shown) can be used to remove only part of the resin and leave a thin film having the desired thickness described above. However, in the preferred method the excess resin remaining upon completion of winding is completely removed from the pipe surface, and resin film 14 is applied thereafter. This method permits selection of the resin and additives which provide best performance in the coating, without being limited to the use of the specific resin used during winding of the filament layer.

After the entire outer surface of the pipe is coated with the resin film, crushable, multicellular particles 30 are applied to the resin, preferably in accordance with the method shown in FIG. 3. An inclined, elongated chute 32 adjacent the pipe channels particles 30 under gravity onto the pipe so the particles adhere to the resin film which permanently bonds the particles to the pipe exterior. the particles tend to accumulate at the end of the chute, which presses the particles down through the resin film into firm contact with the pipe. Thus, the particles are embedded in the resin film whch strongly bonds the particles to the pipe. As the particles are being applied, the pipe is rotated slowly in the direction of the arrow 34 shown in FIG. 3. Excess particles 30 which do not adhere to the resin film fall under gravity in the direction of the arrow 36 in FIG. 3 for collection and reuse.

Thus, the particles are closely packed together in a substantially single layer, and are pressed down firmly into the resin film to provide a strong bond. This coating is illustrated best in FIG. 4, in which the particles are extremely exaggerated in size for clarity.

The crushable particles 30 are bonded to the outer surface of the pipe so that a major portion of the resulting cellular particle layer projects away from the pipe in order that the projecting portions of the particles can be crushed by breaking to absorb energy upon impact. The preferred particle material is a low-cost, multicellular substance with a sufficient compressive strength that allows the particles to absorb a useful amount of energy during impact. This allows the particles to crush progressively upon impact, rather than shattering. In use, when a missile strikes the protective coating, the particles crush progressively in an amount proportional to the force of the blow, which softens or absorbs the blow. The indentation of the broken particles in the protective layer conforms to the shape of the impacting object, which spreads the impact over a larger area of the pipe. This progressive crushing of the particles protects the underlying pipe structure by preventing a damaging amount of impact energy contained in the missile from being transferred to the pipe.

The crushable particles 30 bond so strongly to the pipe that abrasions and minor impacts remove only the outer portion of some particles and leave a substantial remainder. Major impacts crush a larger number of particles, which absorbs a larger portion of the shock. A portion of the crushed particles remain embedded in the resin film to provide some protection against subsequent impacts.

The crushable coating preferably is of particles of fairly uniform size because they provide a uniform coating and better appearance of the final product. As shown best in FIG. 4, the crushable particles are of such a size that they project a substantial distance away from the resin film, whih enables them to receive the energy from the impacting object and crush by breaking without immediately transmitting the energy to the plastic pipe. Good results are obtained when the particle size is in the range of about one-sixteenth inch to about one-fourth inch. Generally, the larger particles give better protection, but the dynamic response of impacted pipe is such that smaller particles can give adequate protection for smaller pipe.

Preferably, the particles 30 are inorganic, multicellular particles selected from the class of materials which includes natural volcanic lightweight aggregate, expanded shale, expanded clay, pumice, and cellular, crushable types of slag and furnace cinder, and mixtures thereof, although other inorganic, multicellular, crushable materials having good energy-absorbing characteristics also can be used. The use of the class of inorganic particles described above provides an extremely low-cost coating for plastic pipe. At the present time, the inorganic, multicellular, crushable particles contemplated by this invention cost about $0.005 per pound. In contrast, a protective pipe coating made from particles of polystyrene foam, or any other expanded polymeric material, are tremendously more expensive. For example, polystyrene foam beads at the present time cost about $0.30 per pound. If polystyrene foam beads having a very low density and compressive strength are used in a protective pipe coating, they are generally incapable of absorbing the amount of energy necessary to protect the plastic pipe from impact damage. On the other hand, if an acceptable impact-protective coating for plastic pipe is made from expanded polymeric material, it would necessitate resorting to plastic foam particles of relatively high strength and density to achieve the compressive strength necessary to provide the required amount of energy absorption. However, such high density plastic foam particles are tremendously more expensive than the crushable, multicellular, inorganic particles contemplated by the present invention, and instead of using such costly plastic particles; it would be nearly as economical to simply increase the wall thickness of the plastic pipe to achieve the desired impact resistance. The present invention avoids this problem by providing a protective layer which is of such low cost that it can be applied to the outer surface of the pipe without the necessity of adding more costly resinous and reinforcing materials to the pipe to increase its wall thickness in order to obtain the desired impact resistance.

In one test on a 14-inch diameter experimental filament-wound, fiber-reinforced plastic pipe, the threshhold of damage to the pipe was tested by impacting the pipe with a 4 pound steel ball dropped on the pipe. The test results showed that the drop height required to cause damage was increased by a factor of 2 to 3 with a coating of ⅛-inch expanded shale particles.

Thus, a low-cost, impact-protective, crushable pipe coating is provided which protects thin-walled plastic pipe from impact damage coming from handling, loading, unloading, or installing the pipe.

We claim:

1. The combination of a plastic pipe, a film of bonding material on the pipe exterior surface, and an outer layer of crushable, multicellular, inorganic particles selected from the group consisting of natural volcanic lightweight aggregate, expanded shale, expanded clay, pumice, slag, and furnace cinder, or mixtures thereof, embedded in the bonding material so as to cover the exterior surface of the pipe, the particles being of substantially greater thickness than the film of bonding material so that the unembedded portions of the particles project away from the pipe body to provide a multicellular, inorganic coating which crushes by breaking to absorb energy upon impact and provides a level of impact protection for the pipe body.

2. The combination according to claim 1 in which the plastic pipe is made from a thermosetting resinous material.

3. The combination according to claim 1 in which the film of bonding material is between about 0.015 to about 0.025 inch thick, and the outer layer of particles is at least about one-sixteenth inch thick.

4. The combination according to claim 1 in which the outer layer of particles is between about one-sixteenth to about one-fourth inch in thickness.

5. The combination according to claim 4 in which the film of bonding material is between about 0.015 to about 0.025 inch thick.

6. The combination according to claim 5 in which the particles are distributed uniformly about the pipe surface in a single layer which covers substantially the entire exterior surface of the pipe.

7. A plastic pipe having a particulate, inorganic, multicellular crushable outer coating of particles selected from the group consisting of natural volcanic lightweight aggregate, expanded shale, expanded clay, pumice, slag, and furnace cinder, or mixtures thereof, embedded in a thin film of bonding material covering the exterior surface of the pipe, the particles being of sufficient thickness that a major portion of the particles projects freely away from the film of bonding material to form an impact protective outer layer which crushes by breaking apart to absorb energy upon impact and provide a level of impact protection for the pipe body.

8. A plastic pipe according to claim 7 in which the outer layer of particles is between about one-sixteenth to about one-fourth inch thick.

9. A plastic pipe according to claim 7 in which the film of bonding material is between about 0.015 to about 0.025 inch thick, and the outer layer of particles is at least about one-sixteenth inch thick.

10. The combination of a plastic pipe, a film of bonding material on the pipe exterior surface, and an outer layer of crushable, multicellular, inorganic particles selected from the group consisting of natural volcanic lightweight aggregate, expanded shale, expanded clay, pumice, slag, and furnace cinder, or mixtures thereof, embedded in the bonding material so as to cover the exterior surface of the pipe, the film of bonding material being about 0.015 to about 0.025 inch in thickness, and the outer layer of particles being between about one-sixteenth to about one-fourth inch thick so the unembedded portions of the particles project away from the pipe body to form a multicellular inorganic protective coating which crushes by breaking to absorb energy upon impact and provides a level of impact protection for the pipe body.

* * * * *